United States Patent [19]
Wheeler

[11] 3,827,778
[45] Aug. 6, 1974

[54] DUAL IMAGING CONCENTRIC OPTICS
[75] Inventor: Bryce A. Wheeler, Los Angeles, Calif.
[73] Assignee: Hughes Aircraft Company, Culver City, Calif.
[22] Filed: Dec. 13, 1971
[21] Appl. No.: 207,294

[52] U.S. Cl..................... 350/55, 350/199, 350/294
[51] Int. Cl. ........................................... G02b 17/06
[58] Field of Search...................... 350/55, 199, 294

[56] References Cited
UNITED STATES PATENTS
2,585,009   2/1952   Henroteau ...................... 350/294 X
3,443,853   5/1969   Todd.............................. 350/294 X
3,455,623   7/1969   Harris ............................ 350/199 X
3,584,937   6/1971   Nishimoto.......................... 350/294

Primary Examiner—David H. Rubin
Attorney, Agent, or Firm—W. H. MacAllister; Donald C. Keaveney

[57] ABSTRACT

An all-mirror optical system using spherical mirrors, planar folding mirrors, and a mirror contoured to correct for spherical aberration.

24 Claims, 10 Drawing Figures

DUAL IMAGING CONCENTRIC OPTICS

BACKGROUND OF THE INVENTION

It is instructive to review various kinds of mirror optical systems which, in the past, have been used with infrared detectors.

A paraboloid system uses a paraboloidal mirror with the radiation detector at the focal point of the mirror. The paraboloid system is free from spherical aberration because the mirror is not spherical. It has low infrared loss because it uses a mirror. Unfortunately it suffers from off-axis coma, and it has a limited field of view.

A cassegrain system is extensively used. Such a system uses a paraboloidal mirror which reflects onto the obtuse side of a hyperboloidal mirror, thence through an aperture in the center of the paraboloidal mirror onto a detector. Such a system is free from spherical aberration and permits the detector to be located behind the optical system. It too suffers from off-axis coma and limited field of view.

A Gregorian optical system has many of the advantages of a cassegrain system, but it is longer than a cassegrain system. The Gregorian system uses a paraboloidal mirror which reflects the incoming radiation onto the concave side of an ellipsoidal mirror, thence through an aperture in the center of the paraboloidal mirror onto a detector. Off-axis coma and narrow field disadvantages are also present.

A Newtonian system uses a paraboloidal mirror which reflects into a reflecting prism or plane mirror. The reflecting prism or plane mirror deflects the light at right angles to the mirror axis onto a detector. A Newtonian system also suffers from off-axis coma.

A Herschelian system uses a paraboloidal mirror with its axis inclined from the direction of the incoming radiation. The detector is placed at the focus of the paraboloidal mirror. The Herschelian system too suffers from off-axis coma.

The Schmidt system uses a spherical mirror with the detector at the focus of the mirror. A refractive corrector plate is positioned between the incoming radiation and the spherical mirror, on the side of the focus away from the mirror, to correct for spherical aberration. The Schmidt system has been used extensively in the infrared astronomical optical detection art. Unfortunately, the corrector lens introduces chromatic aberration and absorbs energy.

BRIEF DESCRIPTION OF THE INVENTION

The apparatus of this invention uses spherical mirror surfaces, planar mirror surfacs, and a corrector mirror for correcting for spherical aberration. In design, the spherical mirror surfaces are concentric about a common point. Planar mirrors are used to fold the optical system. With the folded system, images of the common center are produced. The aberration corrector mirror is positioned substantially in the plane of an image of the center of curvature of the spherical mirrors.

Apparatus contemplated by this invention comprises optical systems which are particularly useful where high resolution, wide field of view, and independence from wavelengths or refractive characteristics are important. The apparatus is all reflective and therefore free from color aberrations, optical energy absorption, and variation of index of refraction with temperature. The spherical concentric mirrors are free from astigmatism and coma.

The geometry of the optical systems of this invention may be visualized as (1) an aperture stop defining an optical axis perpendicular to the plane of the stop and passing through the center of the opening of the stop, and defining a center of curvature at the intersection of the optical axis and the plane of the stop; (2) a plurality of spherical mirror surfaces, centered on the optical axis and concentric about the defined center of curvature; (3) at least one planar mirror, positioned to intercept the optical axis and to produce at least one image of portions of the optical system including the aperture stop and center, images of the spherical mirrors being concentric about their respective image of the center; and (4) a corrector mirror, contoured to correct the system for spherical aberration, positioned substantially in the plane of an image of the aperture stop and center.

Obviously, all spherical aberrations cannot be eliminated. However, the corrector mirror may be contoured to an optimum contour to eliminate a maximum amount of spherical aberration. In general, the higher the $f$ number of the system, the better the spherical aberration correction. Further, the fewer the number of spherical mirror surfaces intercepted by the incoming rays, the better the spherical aberration correction may be.

With a maximum amount of spherical aberration correction, the systems of this invention are high resolution systems.

Further, with the apparatus, large fields of view may be achieved without distortion. Typically, a substantially rectangular long and narrow field of view is desirable.

For a given amount of distortion, the systems of this invention may be designed with small $f$ numbers. For example, an $f1.5$ system is easily achievable.

Because the apparatus is an all-mirror system, the performance of the system is substantially independent of wavelength of the incoming radiation. That is, with appropriate mirror coatings, frequency ranges from the ultraviolet through the far infrared may be accommodated.

Because there are no refractive elements in the system, the system is relatively light weight.

Absence of refractive elements also means that no refractive scattering is experienced.

Because the systems are reimaging systems, an aperture stop may be inserted in the reimaged portion of the system, rejecting unwanted energy.

Where emission from the optics and structure must be reduced by refrigeration, for example is infrared systems, the corrector, detector, and the reimaged portion of the system form a compact package which may be refrigerated while leaving the front end of the optical system unrefrigerated.

Absence of refractive elements means that the energy absorption is negligible. Further, no lenses are present to be clouded. In many situations, no windows are present which further reduces the clouding.

Separation of the aperture stop located at the entrance pupil and the mirror elements allows extended shading of the elements.

In a refractive system, radiation of the characteristics to be used in the system must be used in making optical corrections and testing of the system. With an all-mirror system of the type contemplated by this invention, visible light may be used to check the system.

Further, the use of mirrors allows the system to be relatively thermally insensitive and stable, for the mirrors may be fabricated of identical material.

It is therefore an object of this invention to produce all-mirror optical systems.

It is a more specific object of the invention to produce such optical systems using spherical mirrors and planar folding mirrors.

It is still a more particular object of this invention to provide such a system wherein the spherical mirror surfaces are concentric about the center of an aperture stop.

It is still a more particular object of this invention to fold such an optical system so that the aperture stop and the center of curvature of the spherical mirrors are reimaged to separate the aperture stop and its associated optical elements from the detector and its associated optical elements, whereby the optical elements adjacent the detector may conveniently be refrigerated.

It is yet a more specific object of this invention to provide a corrector mirror for correcting spherical aberration, such mirror being positioned substantially in the plane of the reimaged field stop.

It is another object of this invention to provide an optical system having a broad field of view and high resolution, without coma or astigmatism.

BRIEF DESCRIPTION OF THE DRAWINGS

Other objects will become apparent from the following description, taken in connection with the accompanying drawings, in which.

DETAILED DESCRIPTION OF THE INVENTION

Figure 1:
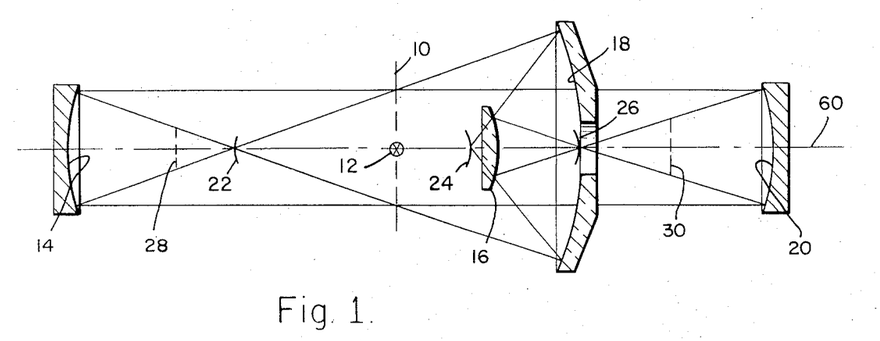
FIG. 1 is a diagram of the concentric optic geometry of this invention.

FIG. 1 is a diagram of the geometry of typical optical systems of this invention. The apparatus of FIG. 1 is not intended to be operable, but only to describe the geometry from which various light paths may be folded out to produce an operable system.

Referring to FIG. 1, an aperture stop 10 defines a plane. Centered within the aperture of the stop 10 is the center of curvature 12 of the optical system. The mirror surfaces 14, 16, 18 and 20 are centered on the center 12. The focal surfaces 22, 24 and 26 are also centered on the center 12 of the optical system. The dashed lines 28 and 30 designate typical positions for the planar surfaces of planar folding mirrors which are used in the various operable embodiments to fold the system.

Figure 2:
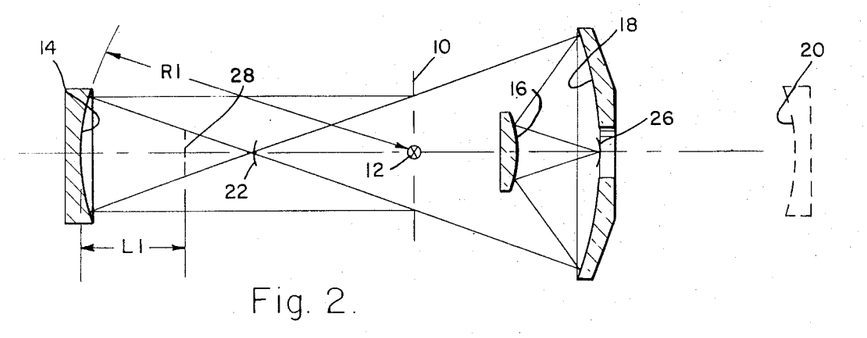
FIG. 2 is a diagram showing the portions of FIG. 1 which are used in a first embodiment of the invention.

FIG. 2 shows the geometry of FIG. 1, designating the surfaces in bold lines which are used in the first embodiment of the invention. It should be noted that the mirror surface 20 is not used in the first embodiment. As shown in FIG. 2, the system still is not an operable system.

Figure 3:
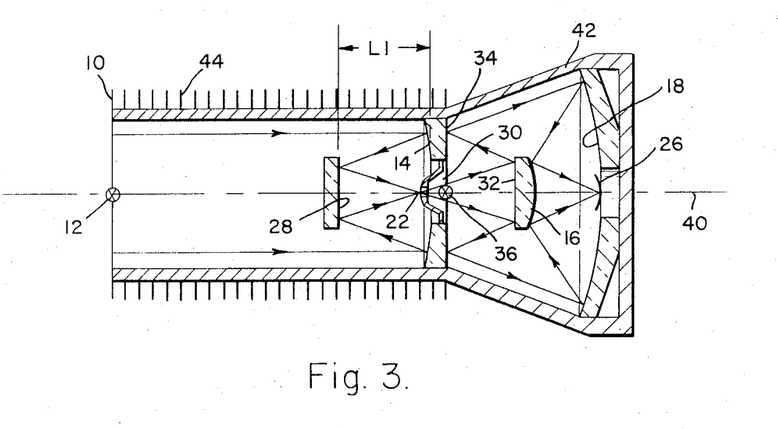
FIG. 3 shows a practical apparatus of FIG. 2, including a pair of planar mirror surfaces for folding the optical path to separate the aperture stop and the image of the aperture stop, including a corrector mirror substantially in the plane of the reimaged aperture stop.

The first embodiment, properly folded to produce an operable system, is shown in FIG. 3. In FIG. 3 the aperture stop 10, defining the center of curvature 12, is positioned at one end of the system. The mirror surface 14 is positioned, as shown, to the right of the stop 10 rather than to the left thereof on a radius R1 from the center of curvature 12. The planar mirror surface 28 is positioned a distance L1 from the center of the mirror surface 14 to fold the optical system to focus at the focal surface 22. The position of the focal surface 22, measured along the light rays from the mirror surface 14, is the same in FIGS. 2 and 3, with the mirror surface 28 merely folding the light rays. A central aperture 30 in the mirror surface 14 allows the light focused at the surface 22 to continue to the right through the aperture 30 to intercept the planar mirror surface 32 which folds the light back onto the mirror surface 34. The mirror surface 34 reflects the light rays in the manner of a planar mirror surface but with correction for spherical aberration of the system. Without the correction for spherical aberration, the surface 34 is a planar folding mirror. The spherical aberration correction will be explained further in this specification. The light is folded back onto the spherical mirror surface 18 from which it is reflected onto the spherical mirror surface 16 thence onto the spherical focal surface 26. The surfaces 16, 18 and 26 are centered on the reimaged center 36. The reimaged center 36 is in the plane of the reimaged field stop 10 which is substantially in the plane of the mirror surface 34. The mirror surface 34 deviates from the plane of the reimaged stop 10 only enough to correct for spherical aberration as described in more detail below.

The entire optical system of FIG. 3 is symmetrical about a center line 40. The surfaces 32 and 28 are perpendicular to the center line 40.

In an infrared system, it is customary to refrigerate the detector and the optical system surrounding the detector. In the reimaged system of this apparatus, in the first embodiment shown in FIG. 3, the infrared detector may be positioned at the focal surface 26. The aperture 30 may be substantially closed with only a pin hole opening in the center at the focal surface 22, and the refrigerated enclosure may surround the surfaces 34, 32, 16 and 18 as well as the photosensor positioned at the focal point 26. Such an enclosure is shown at 42 in FIG. 3. The barrel of the system may support a radiation cooler 44 as shown in FIG. 3.

In the configuration of FIG. 3, the stop 10 also acts as a field stop to limit the field of the incoming radiation. A cold aperture stop may be positioned in the plane of the reimaged center 36.

Figure 4:
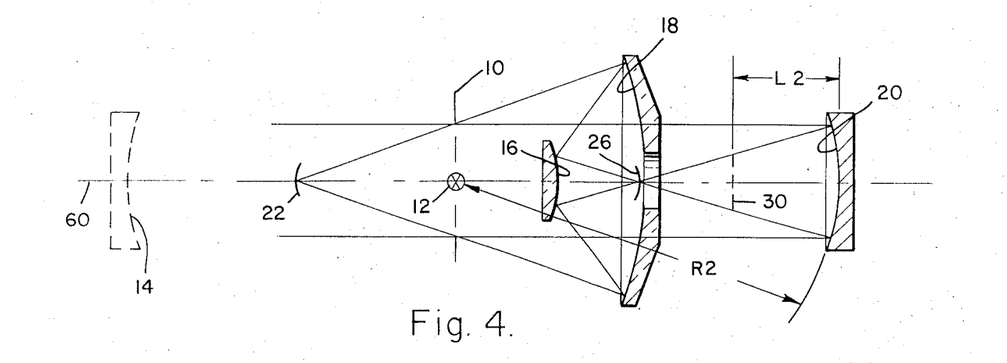
FIG. 4 is a diagram showing the portions of FIG. 1 used in a second embodiment of the invention.

Referring now to FIG. 4, there is shown a second selection of the optics of FIG. 1 to produce a second embodiment of the invention. In FIG. 4, the heavy lines show the portions of the FIG. 1 which are used to produce the second embodiment of the invention. It should be noted that the spherical mirror surface 14 is not used.

Figure 5:
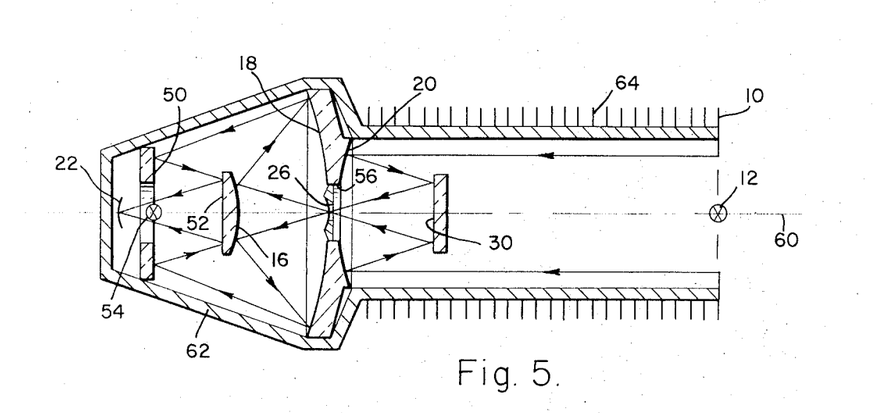
FIG. 5 shows a practical embodiment of the apparatus of FIG. 4, including a pair of planar mirror surfaces for folding the optical path and separating the aperture stop from the image of the aperture stop, including a corrector mirror positioned substantially in the plane of the reimaged aperture stop.

FIG. 5 is a first operable configuration of the second embodiment of the invention. The optical system of FIG. 5 is substantially symmetrical about the axis 60. Incoming radiation passes through the aperture stop 10 onto the surface of a spherical mirror 20 which is centered about the center 12 in the plane of the aperture stop 10 and on the axis 60 thereof. Radiation reflected from the surface 20 is folded on the planar mirror surface 30 to focus at the focal surface 26. The surface 20 has an aperture 56 therein through which the incoming radiation passes onto the spherical surface 16 from which it is reflected onto the spherical surface 18, thence onto the substantially planar folding mirror 50, onto the planar mirror 52 and focused at the focal surface 22. The aperture stop 10 is imaged substantially at the plane of the mirror 50. An image of the center 12 is at 54, and the mirror surfaces 18 and 16 are centered at the imaged center 54. A sensor such as an infrared sensor may be positioned at the focal surface 22. When infrared is used, the portion of the optical system comprising surfaces 16, 18, 50 and 52 may be enclosed within a refrigerated compartment 62 and the barrel of the optical system may be cooled by a radiator 64. Spherical aberration is corrected by contouring the mirror surface 50.

Figure 6:
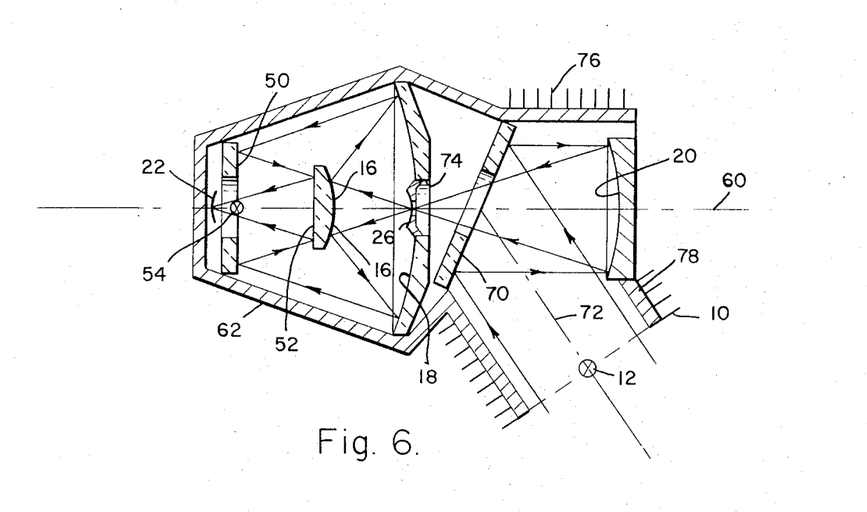
FIG. 6 is a second practical embodiment of the apparatus of FIG. 4, wherein the axis of the aperture stop is angularly offset from the optical axis of the remaining optical system.

FIG. 6 is a second configuration of the second embodiment of the invention wherein the stop 10 defines an aperture whose axis is angularly offset from the axis of symmetry 60. Incoming radiation passes through the aperture stop 10, is reflected at the planar mirror surface 70 from the offset axis 72 along the axis 60 onto the surface of a spherical mirror 20 which is centered, taking into account the folding by planar mirror 70, about the center 12 in the plane of the aperture stop 10 and on the axis 72 thereof. Radiation reflected from the surface 20 is directed through the aperture 74 to focus at the focal surface 26. The radiation continues onto the spherical surface 16 from which it is reflected onto the spherical surface 18, thence onto the substantially planar folding mirror surface 50, onto the planar mirror 52 and focused at the focal surface 22. The aperture stop 10 is reimaged substantially at the plane of the mirror 50. A reimage of the center 12 is at 54, and the mirror surfaces 18 and 16 are centered at the reimaged center 54. A sensor such as a infrared sensor may be positioned at the focal surface 22. When infrared is used, the portion of the optical system comprising surfaces 16, 18, 50 and 52 may be enclosed within a refrigerated compartment 62, and the barrel of the optical system may be cooled by radiators 76 and 78. Spherical aberration is corrected by contouring the mirror surface 50.

Figure 7:
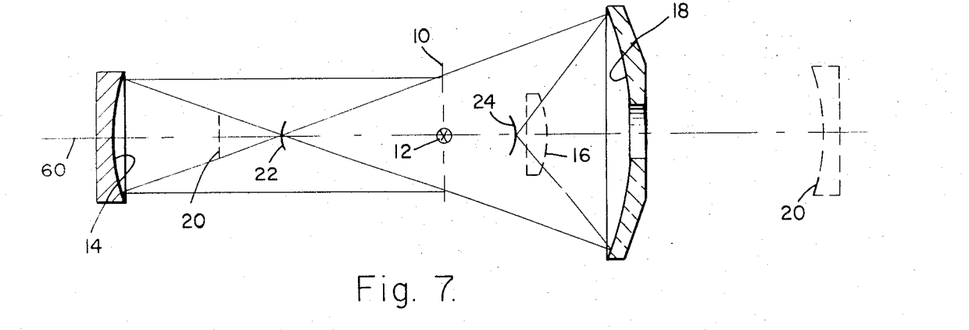
FIG. 7 is a diagram of the apparatus of FIG. 1 showing the portions thereof which are used in a third embodiment of this invention.

Referring now to FIG. 7, there is shown a third selection of the optics of FIG. 1 to produce a third embodiment of the invention. In FIG. 7, the heavy lines show the portions of FIG. 1 which are used to produce the third embodiment of the invention. It should be noted that the spherical mirror surfaces 16 and 20 are not used. Because only two spherical mirror surfaces are used, the third embodiment requires less correction than the first and second embodiments for spherical aberration.

Figure 8:
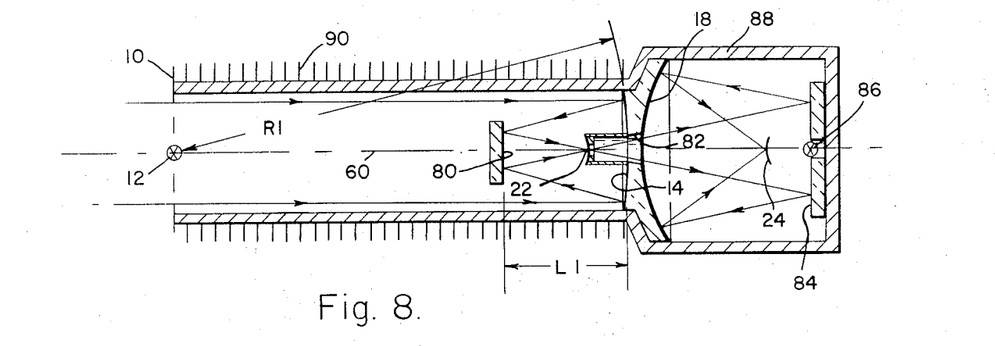
FIG. 8 is a practical apparatus of the configuration of FIG. 7, including a planar folding mirror to separate the aperture stop from the image of the aperture stop, including a corrector mirror positioned substantially in the plane of the reimaged aperture stop.

FIG. 8 is a first operable configuration of the third embodiment of the invention. The optical system of FIG. 8 is substantially symmetrical about the axis 60. Incoming radiation passes through the aperture stop 10 onto the surface of a spherical mirror 14 which is centered about the center 12 in the plane of the aperture stop 10 and on the axis 60 thereof. Radiation reflected from the surface 14 is folded by the planar mirror surface 80 to focus at the focal surface 22. The surface 14 has an aperture 82 therein through which the radiation projects onto the substantially planar folding mirror surface 84, thence onto the spherical mirror surface 18, and it is focused at the focal surface 24. The aperture stop 10 is reimaged substantially at the plane of the mirror surface 84. A reimage of the center 12 is at 86, substantially in the plane of mirror 84, and the surface of mirror 18 is centered at the reimaged centered 86.

A sensor such as an infrared sensor may be positioned at the focal surface 24. When infrared is used, the portion of the optical system comprising surfaces 18 and 84 may be enclosed within a refrigerated compartment 88, and the barrel of the optical system may be cooled by a radiator 90. Spherical aberration is corrected by contouring the mirror surface 84.

Figure 9:
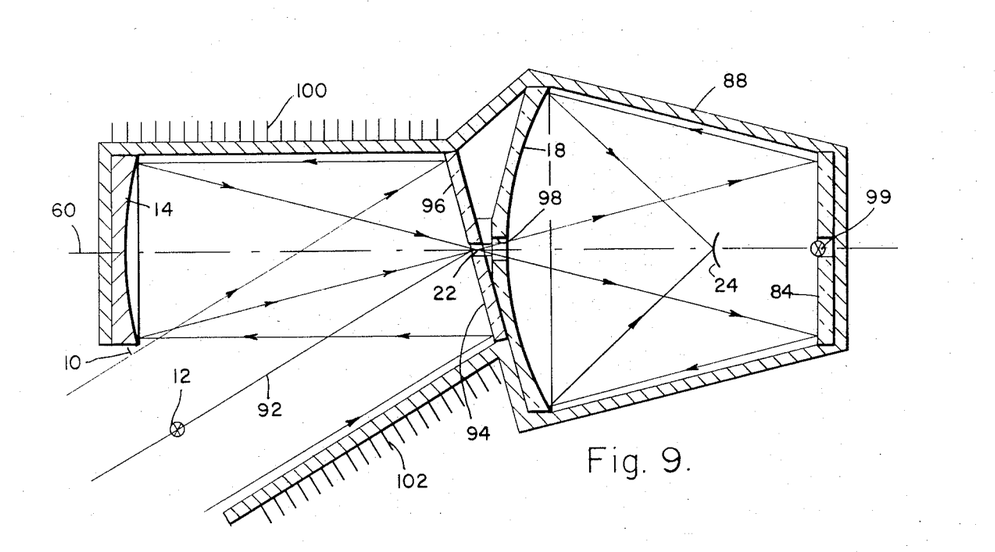
FIG. 9 is an alternative embodiment of the apparatus of FIG. 7 with the axis of the aperture stop angularly offset from the axis of the remaining optics.
Figure 10:
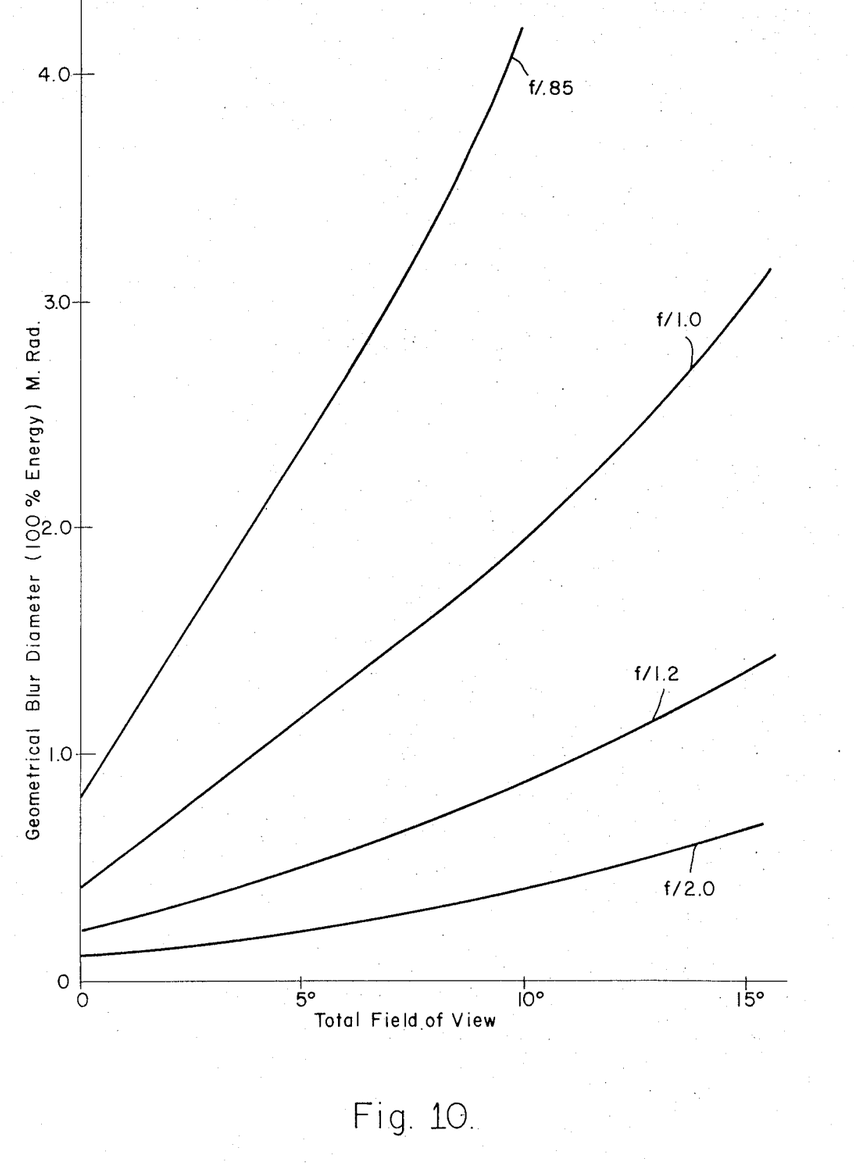
FIG. 10 is an exemplary graph of Blur Diameter v Total Field of View for a Particular Dimensioned System of FIG. 8.

FIG. 9 is a second operable configuration of the third embodiment of the invention with the axis 92 of the apertured stop 10 angularly offset from the axis of symmetry 60 of the remainder of the optical system. In FIG. 9 incoming radiation passes through the aperture stop 10 and is folded by the planar folding mirror 94 into the direction of the axis 60, thence onto the spherical mirror surface 14 which is centered, taking into account the folding by mirror 94, about the center 12 in the plane of the aperture stop 10 and on the axis 92. Radiation reflected from the mirror 14 is focused at the focal surface 22 which is shown within the aperture 96 of the planar folding mirror 94. It is to be stressed that the focal surface 22 need not be within the aperture 96, but placing the focal surface 22 within the aperture 96 allows the aperture 96 to be very small. Radiation continues to the right from the focal plane 22 onto the substantially planar folding mirror surface 84 from which it is reflected onto the spherical mirror surface 18, and it is focused at the focal surface 24. To allow light to pass from the aperture 22 onto the planar mirror 84 an aperture 98 is formed in the mirror surface 18. The aperture stop 10 is reimaged substantially at the plane of the mirror 84. A reimage of the center 12 is at 99, and the mirror surface 18 is centered at the reimaged center 99. A sensor such as an infrared sensor may be positioned at the focal surface 24. When infrared is used, the portion of the optical system comprising surfaces 18 and 84 may be enclosed within a refrigerated compartment 88, and the barrels of the optical system may be cooled by radiators 100 and 102. Spherical aberration is corrected by contouring the mirror surface 84.

It may be seen that the third embodiment of the invention, shown in FIGS. 8 and 9 produces less spherical aberration than the first two embodiments because only two spherical surfaces are intercepted by the light in that embodiment while in the first and second embodiment three spherical surfaces are encountered by the light.

For a particular exemplary embodiment of FIG. 8, wherein distances are measured on axis 60, IF:

$$R_1 = 12 \text{ units}$$

Distance from mirror surface 14 to plane folding mirror 80 = 5 units.

Distance from folding mirror 80 to first focus 22 = 2.5 units.

Distance from first focus 22 to aspheric mirror 84 = 7.5 units.

Distance from aspheric mirror 84 to relay mirror 18 = 4.75 units.

Distance from relay mirror 18 to final focus 24 = 3.0 units.

Then the displacement of the mirror surface from a plane, or sag ($z$) of the aspheric mirror 84 as a function of the radial distance or height ($y$) is preferably optimized at:

$$z = (0.100870 \times 10^{-4})y^4 - (0.198265 \times 10^{-6})y^6 + (0.547062 \times 10^{-7})y^8 - (0.377424 \times 10^{-8})y^{10}.$$

Thus, the invention contemplated by this invention is an all-mirror optical system using spherical mirrors which avoids all of the problems of using lenses, and wherein spherical aberration is minimized. In the system of this invention, high resolution and wide field of view is achieved, free from astigmatism and coma, and free from color aberrations, energy absorption and effects of variation of index of refraction of materials.

Although the invention has been described in detail above, it is not intended that the invention shall be limited by that description, but only by that description in combination with the appended claims.

What is claimed is:

1. An all mirror high resolution wide field of view optical system comprising a plurality of mirrors positioned in coacting optical image forming relationship along an optical axis, said system comprising:
    a. means forming a symmetrical aperture stop lying in a plane perpendicular to said optical axis, said stop being centered on said optical axis and the intersection of said optical axis and the center of said aperture stop defining a first center of curvature point;
    b. at least one planar folding mirror positioned to fold said optical axis and producing at least one image of said aperture stop and said first center of curvature point on said optical axis, said first point and said image thereof comprising a plurality of center of curvature points;
    c. a plurality of spherical mirrors, each of said mirrors being centered on one of said plurality of center of curvature points,
    d. an aspheric mirrors centered on the optical axis and positioned substantially in the plane of said image of said aperture stop to correct the system for spherical aberration, and
    e. said system having all of said mirrors aligned on said optical axis to successively reflect radiant energy incident through said aperture stop from object space to a focal surface to form an image thereon.

2. Apparatus as recited in claim 1 in which a first of said plurality of spherical mirrors is centered about a point defined at the center of said aperture stop and second and third of said spherical mirrors are centered about a first image of said point.

3. Apparatus as recited in claim 2 wherein:
    said first and second spherical mirrors are concave and said third spherical mirror is obtuse, and radiation incoming through said aperture stop intercepts said first spherical mirror surface and is reflected onto a first of said folding mirror surfaces;
    said radiation reflected from said first folding mirror surface is reflected onto a second of said substantially planar folding mirror surface, thence is reflected to a third of said substantially planar folding mirror surface and thence is reflected onto said second spherical mirror surface; and
    radiation reflected from said second spherical mirror surface is incident upon and reflected from said third spherical mirror surface.

4. Apparatus as recited in claim 1 wherein said optical system includes:
    a first concave spherical mirror positioned to intercept radiation passing through and perpendicular to the plane of said aperture stop, the center of said stop defining the center of curvature of said mirror and defining an optical axis perpendicular to said plane, said mirror having a central aperture therein adjacent said optical axis for transmitting radiation therethrough;
    a first substantially planar folding mirror, positioned between said aperture stop and said spherical mirror, to receive radiation from said spherical mirror and to focus said radiation on a focal surface substantially at the surface of said spherical mirror;
    a second substantially planar folding mirror positioned to receive radiation from said focal point through said central aperture from said first folding mirror;
    a third substantially planar folding mirror positioned substantially in the plane of the image of said aperture stop to receive radiation from said second folding mirror;
    a second concave spherical mirror positioned to receive radiation from said third substantially planar folding mirror; and
    an obtuse spherical mirror intercepting radiation from said second concave spherical mirror and focusing said radiation on a focal surface substantially on said optical axis and the surface of said obtuse spherical mirror, the center of curvature of said second concave and said obtuse mirrors being at the center of the image of said aperture stop.

5. Apparatus as recited in claim 4 and further comprising a radiation detector situated substantially at the focal surface of radiation reflected from said obtuse mirror.

6. Apparatus as recited in claim 4 in which said third folding mirror is contoured to correct for spherical aberration of said spherical mirrors.

7. Apparatus as recited in claim 4 in which at least said second concave spherical mirror, said obtuse spherical mirror, and said second and third folding mirrors are cooled.

8. Apparatus as recited in claim 1 wherein said optical system includes:
a first concave spherical mirror positioned to intercept radiation passing through and perpendicular to the plane of said aperture stop, the center of said stop defining the center of curvature of said mirror and defining an optical axis perpendicular to said plane, said mirror having a central aperture therein adjacent said optical axis for transmitting radiation therethrough;
a first substantially planar folding mirror, positioned between said stop and said spherical mirror, to receive radiation from said spherical mirror to direct said radiation through said central aperture to a focal surface;
an obtuse spherical mirror positioned to receive radiation from said central aperture;
a second concave spherical mirror, having a central aperture therein, said first and second concave mirrors being back to back to cause said central apertures to coincide, said second mirror being positioned to receive radiation from said obtuse mirror;

a second substantially planar folding mirror having a third central aperture therein, positioned to receive radiation from said second concave spherical mirror; and
a third substantially planar folding mirror, positioned to receive radiation from said second folding mirror and to direct such radiation through said third aperture onto a focal surface, the center of curvature of said second concave and said obtuse mirrors being at the center of the image of said aperture stop.

9. Apparatus as recited in claim 8 and further comprising a radiation detector situated substantially at the focal surface of radiation reflected from said third folding mirror.

10. Apparatus as recited in claim 9 in which said second folding mirror is contoured to correct for spherical aberration of said spherical mirrors.

11. Apparatus as recited in claim 8 in which at least said second concave spherical mirror, said obtuse spherical mirror, said second and third folding mirrors, and said radiation detector are cooled.

12. Apparatus as recited in claim 1 wherein said optical system includes:
a substantially planar folding mirror, angularly positioned at an angle to said optical axis to define a second optical axis which is the mirror reflection of said first optical axis;
said folding mirror having a first aperture formed centrally thereof in the vicinity of the intersection of said first and second optical axes;
a first substantially spherical concave mirror having its center of curvature at said center of said aperture stop out-folded onto said second optical axis;

the size of said aperture in said first planar mirror being sufficient to allow rays from said concave mirror, originating within the field of view of said aperture stop, to pass therethrough;

means forming a second concave mirror, including a second aperture formed centrally thereof to receive light transmitted through said first aperture;
a first obtuse mirror positioned to receive light transmitted through said second aperture and to reflect such radiation onto said second concave mirror;
a second substantially planar folding mirror, having a third aperture in the center thereof, positioned to intercept radiation reflected from said second concave spherical mirror;
a third substantially planar mirror surface, positioned to intercept radiation from said second folding mirror and to direct such radiation through said third aperture, said second concave mirror and said obtuse mirror being centered on the imaged center of said aperture stop.

13. Apparatus as recited in claim 12 and further comprising a radiation detector situated substantially at the focal surface of radiation reflected from said third folding mirror.

14. Apparatus as recited in claim 13 in which at least said second concave spherical, said obtuse spherical mirror, said second and third folding mirrors and said radiation detector are cooled.

15. Apparatus as recited in claim 12 in which the surface of said second substantially planar folding mirror is contoured to correct for spherical aberration of said spherical mirrors.

16. Apparatus as recited in claim 15 in which said aperture stop is substantially symmetrical about said first optical axis and said spherical mirrors and second and third folding mirrors and said apertures are substantially symmetrical about said second optical axis.

17. An all mirror high resolution wide field of view optical system comprising a plurality of mirrors positioned in coacting optical image forming relationship along an optical axis, said system comprising:
a. means forming a symmetrical aperture stop lying in a plane perpendicular to said optical axis, said stop being centered on said optical axis and the intersection of said optical axis and the center of said aperture stop defining a first center of curvature point;
b. at least one planar folding mirror positioned to fold said optical axis and producing at least one image of said aperture stop and said first center of curvature point on said optical axis, said first point and said image thereof comprising a plurality of center of curvature points;
c. a plurality of spherical mirrors, each of said mirrors being centered on one of said plurality of center of curvature points;
d. an aspheric mirror centered on the optical axis and positioned substantially in the plane of said image of said aperture stop to correct the system for spherical aberration; and
e. said system having all of said mirrors aligned on said optical axis to successively reflect radiant energy incident through said aperture stop from object space to a focal surface to form an image thereon, the elements of said system comprising:
1. a first concave spherical mirror positioned to intercept radiation passing through and perpendicular to the plane of said aperture stop, the center of curvature of said spherical mirror being at the intersection of said optical axis and the plane of said aperture stop, the central region of said spherical mirror having an aperture formed therein;
2. a first substantially planar folding mirror, positioned between said aperture stop and said spherical mirror to receive radiation from said spherical mirror, and to direct said radiation through said central aperture;
3. a second substantially planar folding mirror positioned to receive radiation from said first folding mirror;
4. a second concave spherical mirror, positioned to receive radiation from said second folding mirror and to focus such radiation onto said focal surface, the center of curvature of said second spherical mirror being at the imaged center of curvature of said first spherical mirror.

18. Apparatus as recited in claim 17 and further comprising a radiation detector situated substantially at the said focal surface of radiation reflected from said second spherical mirror.

19. Apparatus as recited in claim 17 in which said second folding mirror is positioned substantially in the plane of the image of said aperture stop and is contoured to correct for spherical aberration of said spherical mirrors.

20. Apparatus as recited in claim 19 in which said mirrors and said apertures are substantially symmetrical about said optical axis.

21. Apparatus as recited in claim 1 wherein said optical system includes:
a first folding mirror, having an aperture therein substantially in the region of said optical axis, to reflect radiation transmitted through said stop substantially parallel to said first optical axis into a direction parallel to a second optical axis;
a substantially spherical concave mirror, positioned to receive radiation reflected from said first planar mirror;
the center of curvature of said spherical mirror being a distance equal to the distance from the center of said spherical mirror to the center of said folding mirror plus the distance from said center of said folding mirror to the intersection with said aperture stop, said distances being measured along said optical axes, the intersection of said first axis with the plane of said optical stop defining a first center of curvature point;
a second concave spherical mirror having a second aperture therein, said second aperture being aligned with the aperture in said planar mirror and being of sufficient size to receive radiation transmitted from said first spherical mirror through said first aperture stop;
a second substantially planar folding mirror positioned to receive and intercept radiation transmitted through said second aperture; and
said second spherical mirror being positioned to intercept radiation reflected from said second folding mirror and to focus such received radiation onto a focal surface.

22. Apparatus as recited in claim 21 and further comprising a radiation detector situated substantially at the focal surface of radiation reflected from said second spherical mirror.

23. Apparatus as recited in claim 22 in which said second folding mirror is positioned substantially in the plane of the reimage of said aperture stop, the center of curvature of said second mirror being at the reimage of the center of curvature of said first spherical mirror and substantially within the plane of the reimage of said aperture stop, said second folding mirror being contoured to correct for spherical aberration of said spherical mirrors.

24. Apparatus as recited in claim 23 in which said spherical mirrors, said apertures, and said second planar mirror are substantially symmetrical about said second optical axis.

* * * * *